July 24, 1962     O. R. RICE     3,045,996
ULTRA HIGH PRESSURE BLAST FURNACE
Filed Nov. 19, 1959     5 Sheets-Sheet 5
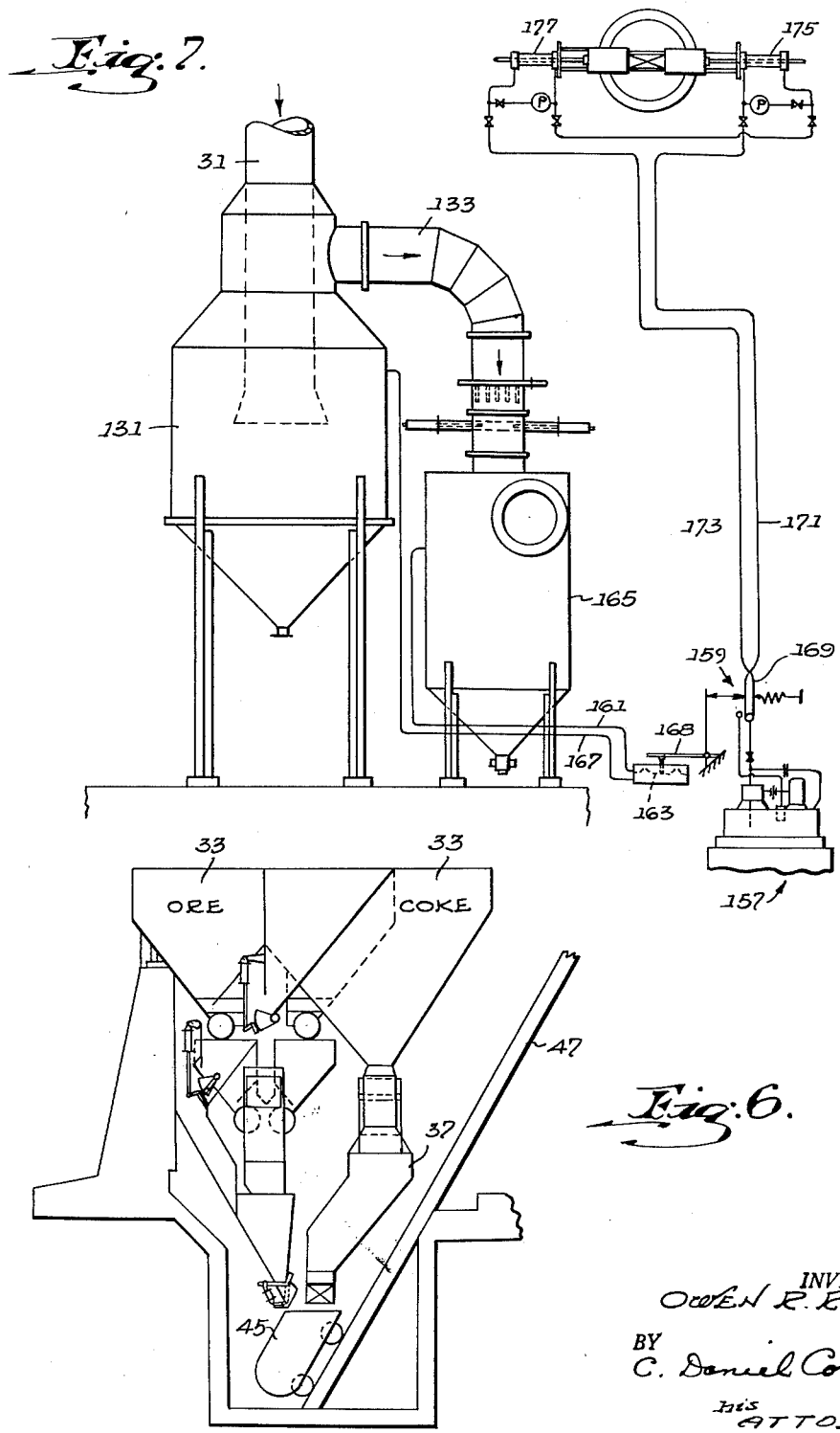
INVENTOR.
OWEN R. RICE
BY C. Daniel Cornish
his ATTORNEY United States Patent Office 3,045,996
Patented July 24, 1962

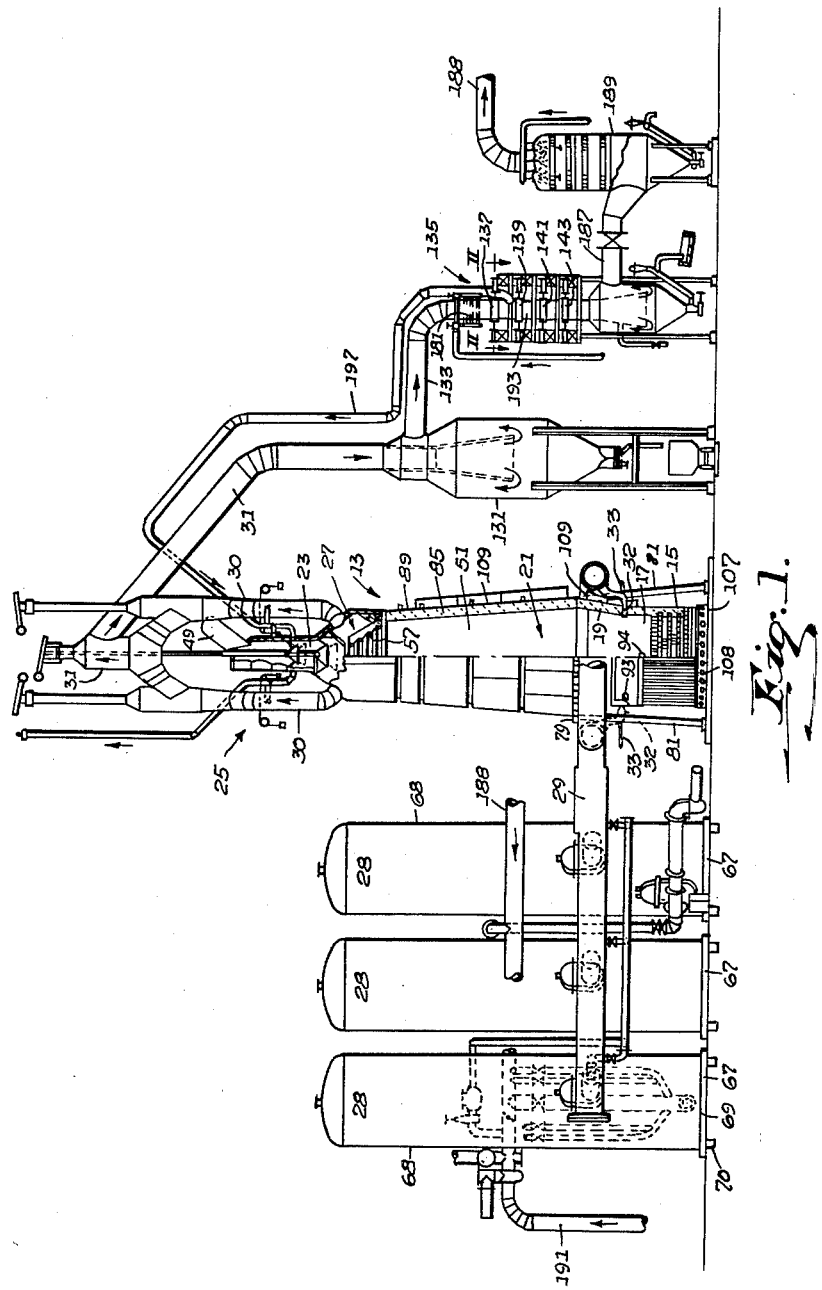

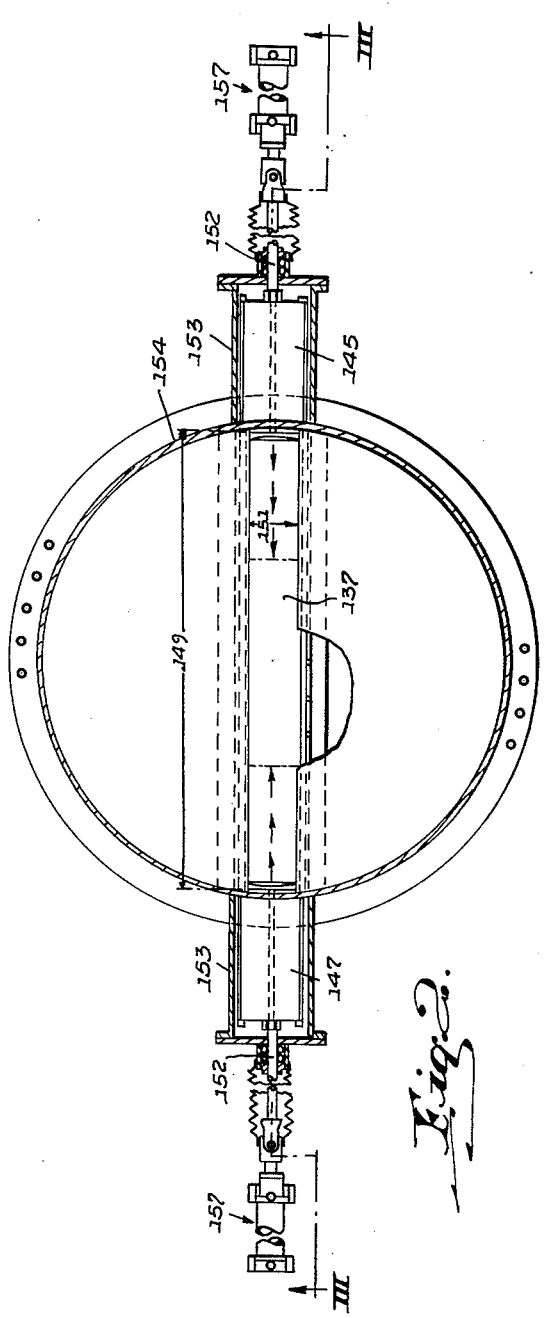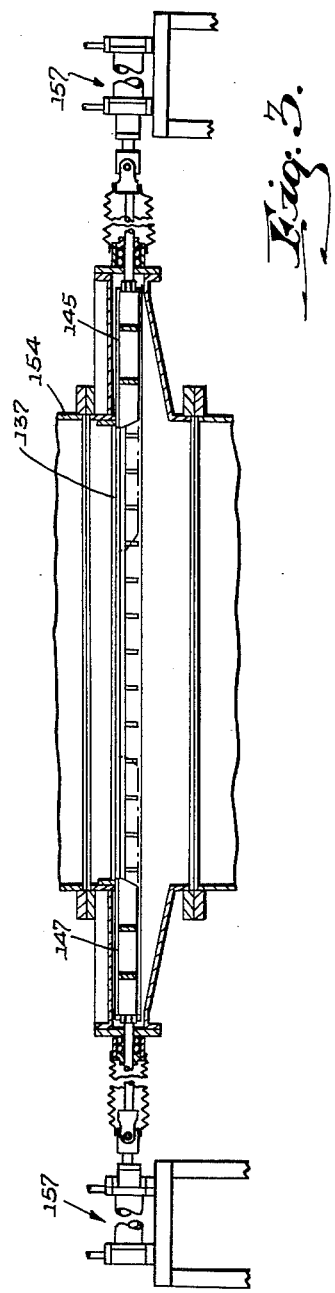

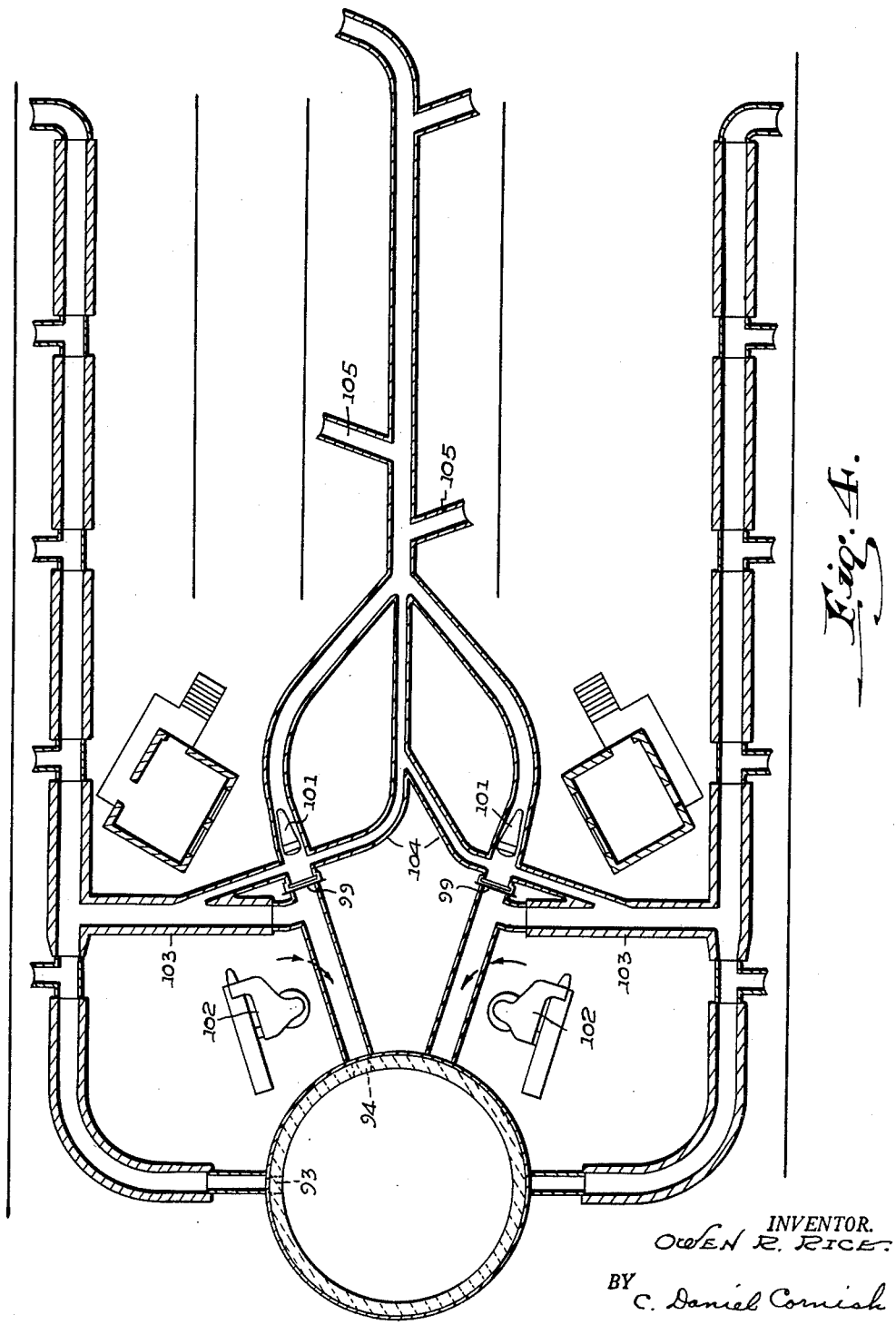

3,045,996
ULTRA HIGH PRESSURE BLAST FURNACE
Owen R. Rice, Ben Avon, Pa., assignor to Koppers Company, Inc., a corporation of Delaware
Filed Nov. 19, 1959, Ser. No. 854,042
2 Claims. (Cl. 266—31)

This invention relates to blast furnaces and more particularly to blast furnaces adapted to operate at high pressures for the reduction of iron ores.

In the reduction of ores, as is required in various industries, a blast furnace is frequently used. The ores are reduced in the furnace with coke, flux, such as limestone and dolomite, and a heated gas such as air which is forced into the furnace under pressure. In the reduction of iron ore in the blast furnace for the production of pig iron, the coke engenders heat and temperature for a metallurgical reducing action with the ore and supplies a reducing agent for the reduction process. The heated air unites with the coke to produce heat, high temperature and also carbon monoxide which acts as a reducing agent. The flux forms a slag in combination with the gangue of the ore and ash of the coke, which slag restrains such material as silicon and sulphur from entering the iron produced by the reaction.

Conventionally, the average internal pressure in such blast furnaces is maintained between 7½ to 13 pounds per square inch gage and normally the internal pressure at the top of the furnace is less than 50 inches water column. It is beneficial, however, that the average pressure in the furnace be higher than has been the case heretofore. For example, at an average internal pressure of between 40–50 pounds per square inch gage, the degree of iron ore reduction in a given length of time may be up to about twice the degree of iron ore reduction in a given length of time at a normal top pressure of 50 inches water column. A conventional furnace of a given size (e.g. with about a 28 foot hearth diameter) when charged with raw materials will provide a daily output of about 2000 tons of iron, whereas a high pressure furnace of like given size operating advantageously at an average internal pressure from about 40–50 pounds per square inch gage in contrast may provide a daily output of up to about 4000 tons of iron.

Unfortunately, however, the present blast furnaces have serious inherent and fundamental limitations for operation with internal furnace pressure in excess of about 13 pounds per square inch gage, hereinafter called ultra high pressures. One limitation has been present because the blast furnaces have been comprised of an annular wall of fire clay brick for resisting intense heat and friction inside the blast furnace. It has been found necessary to provide water cooling for the brickwork and this cooling was usually accomplished by placing a plurality of cooling boxes in the brickwork. The cooling boxes were removable for the most part through apertures provided in the metal blast furnace shell disposed around the brickwork. It has been difficult to seal leakage of gas under pressure from the inside of the furnace to the atmosphere through the apertures, through the brickwork and around the cooling boxes so that limitations presented in furnace operation thereby have been too severe to permit ultra high internal pressure operation of the blast furnaces.

Another limitation has been that the bell chamber apparatus of the blast furnaces known heretofore was inadequate. Heretofore upper and lower bells formed a pressure locking bell chamber located at the top of the furnace which bell chamber primarily prevented the escape of gas from the top of the furnace into the atmosphere. The upper bell has been opened for the collection of material on the lower larger bell into a "round." Thereafter the top bell has been closed and the larger bottom bell has been opened, thus delivering the material on the large lower bell into the furnace. The lower bell has been up to 50 feet in circumference such that it has been difficult to maintain proper sealing contact between the lower bell and extensions of the bell chamber over the entire circumference of the lower bell. Also, the lower bells were so large that it was difficult to repair and replace them. Often the lower bell sealing surface was prepared with high cost, wear resisting metal but due to the large size of the lower bell it was extremely expensive to provide such a sealing surface.

An object of this invention, therefore, is to provide improved apparatus which overcomes the mentioned disadvantages.

A further object of this invention is to provide a blast furnace adapted to operate at an average internal pressure of above about 13 pounds per square inch gage.

A further object of this invention is to provide a blast furnace adapted to operate at average internal pressure of about 40–50 pounds per square inch gage.

This invention contemplates a blast furnace capable of being operated at an average internal pressure of above about 13 pounds per square inch gage. In one embodiment of this invention a blast furnace is formed with an annular wall which is comprised principally of high temperature resistant brick completely covered by an annular water-tight metal jacket which is structurally continuous from top to bottom. The pressure locking bell chamber in operable association with the top of the jacket has interchangeable upper and lower bells. Also, a throttling device simultaneously cleans and releases gas from a furnace chamber at adjustably controlled pressure drops and is adapted to produce an average internal pressure in the blast furnace of above about 13 pounds per square inch gage. The throttling device in addition has a provision for producing a pressure in the pressure locking bell chamber which is approximately the same as the pressure in the furnace chamber adjacent the lower bell.

The above and further objects and novel features of the invention will appear more fully from the following detailed description when the same is read in connection with the accompanying drawings. It is to be expressly understood, however, that the drawings are not intended as a definition of the invention but are for the purpose of illustration only.

FIG. 1 is a partial elevation of an embodiment of this invention.

FIG. 2 is a partial top view of the throttling device of FIG. 1, part showing in section.

FIG. 3 is a partial cross section of FIG. 2 through III—III.

FIG. 4 is a partial plan view of tapping means for the blast furnace of FIG. 1, parts showing in section.

FIG. 6 is a partial elevation of charging apparatus of this invention for the furnace of FIG. 1.

FIG. 7 is a schematic view of the actuating means for the cleaning and throttling apparatus of FIG. 1.

Figure 5:
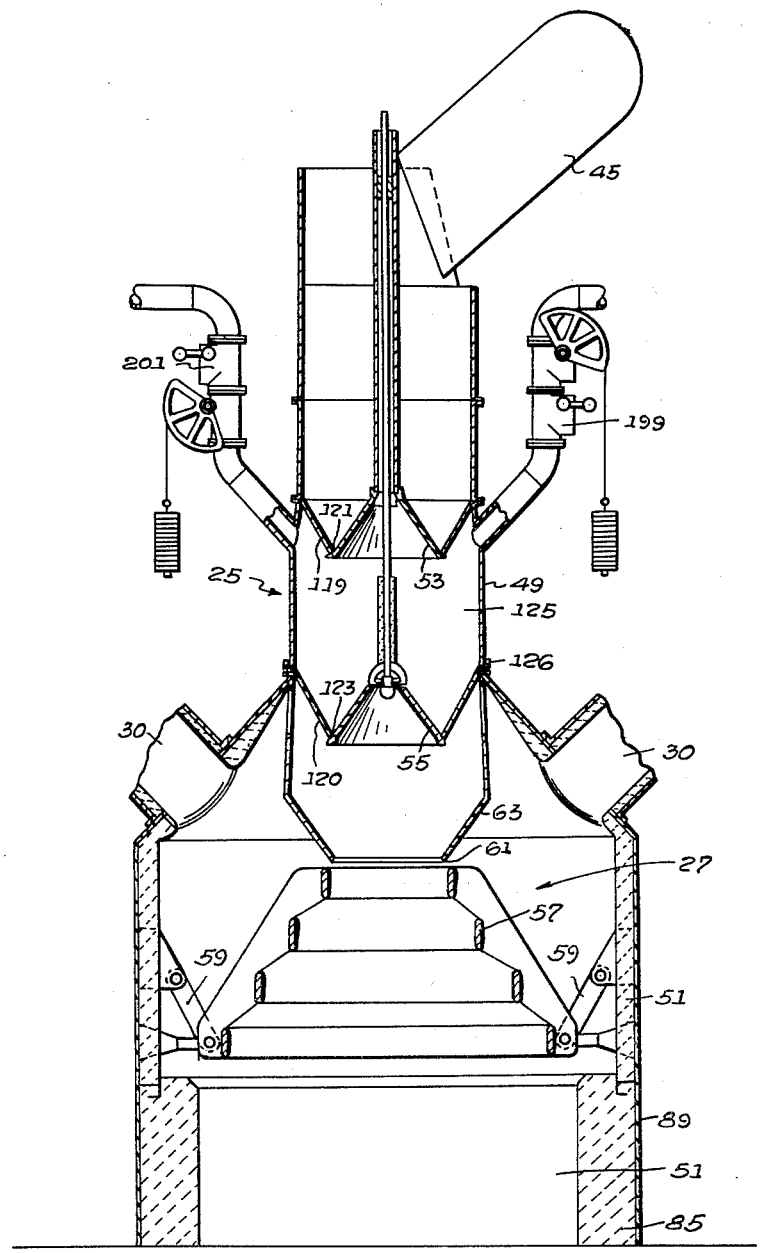
FIG. 5 is a vertical cross sectional view of the upper portion on an enlarged scale, of the blast furnace shown in FIG. 1.

Referring to FIG. 1, a blast furnace for the reduction of ores, particularly iron ores, and the production of iron therefrom is denoted generally as 11. Furnace 11 is comprised generally of a shaft 13 having from the bottom up a base 15, hearth 17, bosh 19, in wall section 21 and pressure locking bell chamber 23. Blast furnaces conventionally have a charging apparatus such as loading apparatus 25 (FIGS. 1 and 5) and distribution means such as distribution means 27 for charging the furnace with ore, coke and flux. By a reaction with heated gas such as air fed into the furnace from heaters such as stoves 28 connected to suitable sources of gas the ore, coke, and flux produce molten iron and slag in the hearth. Discharge gas is removed from the furnace by uptakes 30 and downcomers 31 and after cleaning, this discharge gas may be used for heating the blast taken into the stoves and introduced into the furnace chamber.

The conventional stockhouse serving a 2000 ton daily pig iron production furnace has a 24 hour ore storage capacity. For a 4000 ton daily production, however, retaining hoppers 33 (FIG. 6) of about an 8 hour capacity are fed almost continuously from principal ore, coke and flux supplies (not shown) by endless conveyor belts (not shown). The ore, coke and flux may be beneficiated such as by screening and agglomerating. Each hopper 33 has a weighing hopper 37, preset as to weight and functioning on a preset program to deliver consignments into conventional skip tub 45. The skip tub or car 45 is run up and down inclined tracks 47 by means of a conventional skip hoist (not shown) so as to deliver measured amounts of materials into cylindrical hopper 49 (FIGS. 2 and 5) at the top of the blast furnace from whence charging of the materials into furnace chamber 51 takes place. Although conventional for the most part, the apparatus described has the advantage of eliminating the conventional scale cars.

For charging the furnace, it has been customary to provide a pair of bells like bells 53 and 55 (FIG. 5) arranged in series in a hopper 49, one bell being open while the other is closed so that the furnace may be charged without the escape of gas therefrom. For example, bell 53 being opened after the skip car delivers its load, the material drops into hopper 49. Thereafter closing bell 53 and opening bell 55 a sufficient distance allows material to drop into furnace chamber 51. With this invention, charging of one or more separate and consecutive loads of coke, flux and ore into the furnace in sequence is advantageous. A conventional mechanical or electronic stock line gage (not shown) determines the height of the stock in the furnace to control furnace filling.

The charged material may form hills and valleys in a conventional furnace permitting the lumpy material in the charge to segregate by rolling down the hills into the valleys thus forming zones of open texture material and closer texture material which permit marked segregation of gas flow upward through the furnace charge. To prevent this problem louver bands 57 suspended by arms 59 attached to the inside of furnace chamber 51 and arranged concentrically above and below one another in echelon form a plurality of substantially cylindrical surfaces approximating a single cone bounded at the top by throat 61, such as disclosed in United States Patent 2,050,379. As the furnace charge moves downwardly due to the smelting operation in the lower part of the furnace, the more recently charged material in hopper 63 moves downwardly into the region bounded by the louver bands, the manner of movement entirely avoiding the mentioned problem of hills and valleys.

Heaters or stoves 28 are connected in series with a conventional source of gas such as air under pressure (not shown) for supplying a blast of such hot gas or air through conventional mains 29 and tuyeres 32 into furnace chamber 51. These tuyeres are cooled by conventional water pipes 33 to prevent destruction of the tuyeres by the heat of the air passing therethrough and by the heat of combustion taking place in the furnace chamber adjacent the tuyeres. To handle the requirements necessary for operation with the ultra high pressure blast furnace of this invention, advantageously stoves 28 may be of the type disclosed in the copending application by Edward A. Lejeck and Archibald J. Merritt, entitled "Blast Furnace Stove Bottom Construction," assigned to the assignee of this invention. Stoves 28 have circular bottoms 67 attached to the inside of stove shells 68 which are partially imbedded in concrete mats 69. To align the bottom of the shell for further fabrication, the mats 69 rest on a ring 70 which rests on a suitable base (not shown) and the ring 70 is shimmed up as needed.

The above has described auxiliary equipment for operation with the blast furnace of this invention.

Conventionally, blast furnaces comprise an annular wall of refractory blocks or bricks forming a hearth, bosh and inwall, the inwall being supported by a mantle such as 79 and columns such as columns 81. To increase the operative life of the bricks, cooling boxes have been placed therein, the boxes being removeable for the most part, but it has been difficult to seal the boxes and the furnace wall against leakage of gas from the inside of the furnace to the atmosphere. A bell chamber having a large lower bell prevented gas from escaping from inside the furnace. Also, conventionally uptakes and downtakes such as uptakes 30 and downtake 31 provided means for removing gas from inside the blast furnace so as to maintain internal furnace pressure below 13 pounds per square inch gage (usually about 50 inches of water pressure top pressure) and the removed gas was cleaned by conventional dust cleaning apparatus.

In accordance with one embodiment of this invention, blast furnace 11 has a high temperature lining or wall 84 formed primarily with refractory bricks 85 arranged in an annular array in the hearth, bosh and inwall sections to form interior furnace chamber 51. Mantle 79 and columns 81 resting on a suitable base (not shown) carry weight of the refractory bricks in the inwall section and the material contained thereby. Some of the bricks are advantageously made of carbon. Jacket 89 completely covers the outside of the refractory bricks 85. The jacket is made continuous structurally from top to bottom advantageously by butting curved plates and welding their butting ends together to form an annular jacket. The jacket thus forms a complete shell around furnace 11 except where uptakes 30, tuyeres 32, slag holes 93 and tap holes 94 enter through the wall thereof and the jacket operates in such a manner as to be gas and water-tight. Thus the jacket together with wall 84 of the furnace is strong enough to withstand an ultra high internal pressure produced in the furnace in a manner to be described in more detail hereinafter.

On the outside of jacket 89 under hearth 17, concrete supports 107 have air cooling channels 108 therein through which suitable fans (not shown) blow air so as to maintain the bottom of the hearth at a reasonably low temperature. Water cooling channels 109 are advantageously upright channels of U-shape in cross section which are completely enclosed and connected to each other all the way around the hearth, bosh and substantially all of the inwall section up to the top of the bricks thereof. The channels 109 are welded directly to the outside of the jacket 89 around the hearth, bosh and a portion of the inwall section for strength. Means (not shown) circulate controlled amounts of water through the channels so that there is no undue difference in expansion and contraction in the various portions of the jacket and thus the jacket remains relatively cool thereby to maintain its strength against rupture. Moreover, the jacket being continuous structurally from top to bottom as described, the cooling water in the channels 109 eliminates the need for expansion joints in the jacket shells known heretofore.

A cylindrical housing 49 (FIG. 5) in operable association with the top of jacket 89 substantially closes furnace chamber 51 and yet permits filling of the furnace. To this end housing 49 has therein at least two concentrically located conical shaped bells 53 and 55, the lower bell advantageously being of small diameter compared with conventional large lower bells. The bells form with extensions 119 and 120 of housing 49, selectively closeable sealing annular surfaces 121 and 123 which prevent gas loss from the furnace while providing means with distribution means 27 for charging the furnace. A conventional lifting and lowering mechanism (not shown) lifts and lowers bells 53 and 55 selectively so that the contacting of sealing surfaces 121 and 123 with extensions 119 and 120 provide a closed pressure locking bell chamber 125 and means to be described in more detail hereinafter produce a pressure in pressure locking bell chamber 125 which is approximately the same as the pressure in the furnace chamber 51 adjacent the bottom bell 55 so that the bell 55 can be opened easily. Advantageously the bells are interchangeable and the bell chamber is removable from the furnace shell by means of bolts 126 for easy repair and replacement of the bells.

Instead of building up a large body of material on the lower bell into a "round" such as has been conventional practice, it has been found that advantageously skip car 45 loads separately charges of coke, flux and ore by means of a conventional skip hoist (not shown) and loading apparatus 25 directly into the furnace chamber. When it is desired to fill material into furnace 11 the upper bell 53 lowers while the lower bell 55 remains in the position shown in FIG. 5. Thereafter, the upper bell 53 raises and the lower bell 55 lowers so that the material on the lower bell falls into the furnace. In order to evenly distribute the material delivered into the furnace louver bands 57, being concentrically arranged in echelon, direct the material delivered into the furnace from lower bell 55 evenly into the furnace. Bands 57 are held by bars 59 attached to the inside of the furnace wall 84.

Gas, such as air forced under pressure from stoves 28 through tuyeres 32 and into furnace chamber 51, causes a reaction between the gas, ore, flux and coke in the furnace to produce iron. In certain cases small amounts of fuel gas may be mixed with the air before the air is introduced into the furnace through the tuyeres. Two slag holes or cinder notches 93 and two tap holes 94 advantageously provide means to remove the increased amounts of slag and iron produced by operation of the blast furnace of this invention.

During operation of the furnace advantageously a conventional mixture of waterless mud fills the tap holes, the plugging material being removed by a conventional drill 102 after each cast so that iron flows from the furnace. As shown in FIG. 4, each tap hole has its own trough 97, skimmer 99, dam 101 and cinder fall 103 and advantageously one iron runner 104 and set of ladle spouts 105 are provided. Conventional mud guns 102 plug the tap holes with the plugging material when desired. One of the cinder notches may be open so as to be in constant use. Plugging of the cinder notches when desired, however, is accomplished by conventional automatic cinder notch plugs or similar means.

Uptakes 30 attached to the outside of jacket 89 provide an opening through the jacket and bricks 85 into the furnace chamber 51 so that gas introduced into the furnace chamber passes up through the material in the furnace and through the downcomer 31. Thereupon the gas passes into dust catcher 131 and reverses its direction so as to remove large solid particles entrained in the gas. Conduit 133 then conducts the partially clean gas to orifice washer 135. Advantageously orifice washer 135 may be of the type disclosed in copending application Serial No. 766,072, filed October 8, 1958 by Owen R. Rice and assigned to the assignee of this invention, now U.S. Patent No. 2,964,304. Orifice washer 135 throttles the gas from conduit 133 so that an ultra high pressure may be produced in the blast furnace. Advantageously the size of orifices 137, 139, 141 and 143 can be changed to cause a desired ultra high pressure in the blast furnace, the pressure being increased or decreased as desired.

The advantageous embodiment contemplated by this invention for throttling the blast furnace discharge gas passing through conduit 133 comprises pairs of oppositely disposed plates 145 and 147 (FIGS. 2 and 3) spaced to form between them orifices 137, 139, 141 and 143, each being greater in length 149 than in width 151 which is constant. As shown, each orifice is preferably rectangular and initially of a length 149 at least twice the width 151 of the orifice. The effective cross sectional area of each orifice is adjustable by means of moveable orifice closure thrust rods 152 attached to oppositely disposed sliding plates 145 and 147 which are mounted to move to and from each other over their associated orifice thus to decrease and increase selectively the effective length of the orifice for passage of gas.

The plates 145 and 147 slide into and out of housing 153 on diametrically opposite sides of conduit section 154 by means of rods 152 operable with an actuating means 157. In accordance with another feature of this invention, advantageously actuating means 157 may operate to change the size of the orifices so as to maintain a constant pressure in furnace chamber 151 even though the pressure of gas forced into chamber 51 changes. In one embodiment, conventional regulating means 159 has impulse line 161 leading from dust catcher 131 to one side of diaphragm 163 and impulse line 167 leading from the bottom of throttle washer 165 to the opposite side of diaphragm 163. Lever 168 connected with the diaphragm at one end and jet pipe 169 at the other end adjusts jet pipe 169 in one direction to flow liquid through pipe 171 and in the other direction to flow liquid through pipe 173. Flow of fluid through pipe 171 toward piston 175 causes actuation of piston 175 to close orifice 139 associated therewith and flow of fluid through pipe 173 toward piston 177 causes actuation of piston 177 to open the orifice 139 associated therewith. Similar regulating means 159 may be associated with orifices 137, 141, and 143.

Spraying water into the gas stream in conduit 133 with sprays 181 and passing the wet gas through orifice 137 causes washing and throttling of the gas to take place simultaneously. It has been found that a series of orifice plates provide substantial cleaning or washing of solid particles entrained in a gas by wetting the entrained particles. The wetted particles then drop to the bottom of washer 135 and the gas by reversing its direction passes out the washer 135 free of water and wetted particles and then through conduit 187 whereupon the gas may be further cooled in cooler 189. Thereafter the cleaned and cooled gas passes out conduit 188 and some of this gas returns to the burners in stoves 28 wherein the gas burns to produce heat for heating combustible gas taken into the stoves by conduit 191.

It has been found that the pressure drop across the first orifice acting as an inlet into a first orifice chamber 193 is small while the cleaning effect thereof is sufficiently great so that a part of the cleaned gas passing through orifice 137 into conduit 197 is sufficiently close to the pressure of the gas pressure at the top of the blast furnace chamber 51. Conventional valve 199 when open causes gas to flow into chamber 125 so that when both the upper and lower bells are closed the pressure in chamber 125 is approximately the same as the pressure in the furnace chamber 51. The lower bell 55 thus can be lowered easily to deliver material into the furnace chamber 51 and even if there is some small differential between the pressure in the pressure lock chamber 125 and the furnace chamber 51, the diameter of the bells being quite small, the degree of pressure differential does not interfere with the loading operation. Moreover, orifice 139 acting as an outlet for orifice chamber 139 can be adjusted to minimize the pressure drop across the first orifice while maintaining the required pressure in the furnace. Conventional pressure relief valve 201 is connected with chamber 125.

In operation, material conveyor belts (not shown) feed hoppers 33 with ore, coke, and flux, the materials being fed from the bins to weighing hoppers 33 which deliver weighed loads of material into skip cars 45. Material filled into skip cars 45 is then delivered by skip hoist means (not shown) into chamber 125 provided in cylindrical housing 49 above bell 55, that bell being closed with cylinder extension 120 and the upper bell 53 being open. Raising the upper bell 53 then seals surface 121 against extension 119 and lowering bell 55 causes the material in bell chamber 125 to fall into louver grates 57 which evenly distribute the material into the furnace chamber 51. By then raising lower bell 55 sealing surface 123 contacts extension 120 so that subsequent further charges of coke and other materials can be dumped into the furnace in like manner.

Stoves 28 heat air passing therethrough from conduit 191 and convey the heated air into furnace chamber 51 by means of tuyeres 30 so as to heat the inside of the furnace. The hot gas introduced into the furnace chamber 51 reacts with materials in the furnace to produce heat, temperature and a reaction which will be understood by metallurgists so that iron and slag are produced which flow to the bottom of the furnace, the slag floating on top of the iron. At suitable intervals the iron is removed from the hearth by means of tap holes 94. As mentioned above, two tap holes are provided to handle the increased amounts of iron produced by the high pressure blast furnace of this invention. Slag is removed through cinder notches 93 continuously or at frequent intervals.

In order to prevent escape of gas while charging furnace 11, bells 53 and 55 are closed and the gas in the furnace is removed by means of uptakes 30 and downcomers 31. Thereupon the gas passes through a dust catcher 131 which has walls thick enough to withstand ultra high pressures and into an orifice washer 135 also built to withstand ultra high pressures. Orifice 137 causes the gas entering washer 135 to be cleaned and orifice 139 causes a portion of the cleaned gas to pass through conduit 197 and valve 199 into bell chamber 125. The major portion of the gas passes through orifices 139, 141 and 143 whereby the gas is further cleaned. Thereafter the clean gas reverses its flow and passes through conduit 187 and into cooler 189. Meanwhile, diaphragm 163 of regulating means 159 being responsive to pressure changes in furnace chamber 51, when the pressure in chamber 51 drops, orifice 139 is closed until a desired pressure in chamber 51 is obtained. Likewise when the pressure in chamber 51 is too high, regulating means 159 opens orifice 139 to lower the pressure in chamber 51 to a desired level.

When it is desired to lower bell 55, valve 199 is open so that the pressure in bell chamber 125 is the same as or slightly less than the pressure in furnace chamber 51. When it is desired to load material into bell chamber 125, valve 201 opens and gas in bell chamber 125 vents to the atmosphere through valve 201. Thereupon upper bell 53 lowers easily to dump material into bell chamber 125.

The foregoing has described a novel blast furnace. An advantage of the novel furnace is that it is possible to completely surround the interior lining of the blast furnace with a water and gas tight jacket. The jacket in accordance with this invention being structurally continuous from top to bottom except where the uptakes, the tuyeres, tap holes, and cinder notches 33 pass therethrough makes it possible for the jacket to be adequately cooled by means of external cooling channels located entirely on the outside of the jacket, for example by circulating water from a suitable source into the cooling channels on the jacket. The invention provides that air likewise may be introduced into cooling channels around the hearth and water may be introduced around the tuyeres. A further advantage of this novel structure is that there can be used at the top of the furnace bells which have a small diameter and which are easy to move even though there is a small pressure differential from the pressure locking bell chamber to the furnace chamber.

Still another advantage of this invention is that it provides a gas washer which simultaneously cleans and throttles gas and removes discharge gas from the blast furnace under adjustably controlled conditions. In accordance with one embodiment of this invention, the adjustment of an orifice washer is automatic whereby the throttling action of the orifice washer in the blast furnace maintains a constant pressure greater than about 13 pounds per square inch gage. This novel arrangement makes it possible to produce variable pressures in the blast furnace. The ultra high pressures contemplated by this invention produce efficient and improved cleaning of the gases removed from the furnace together with greatly increased ore reduction. Also, the described orifice washer makes it possible to equalize substantially the pressure in the furnace and the pressure locking bell chamber with clean gas so that an ultra high pressure furnace can be charged easily.

What is claimed is:

1. A blast furnace for reducing iron bearing ores; comprising an annular wall formed of refractory blocks, a gas tight metal jacket which is structurally continuous from top to bottom and completely encompassing said wall, an annular cooling jacket cooperating with said metal jacket to cool same, a pair of spaced end bells mounted in the upper end of said annular wall and defining a pressure locking bell chamber so as to form a substantially closed furnace chamber, means for introducing gas under pressure into said furnace chamber, means for discharging gases from said furnace evolved during the reduction of said ore, gas washing means connected to said discharge means, said gas washing means including a plurality of lengthwise spaced orifice plates mounted in an elongate conduit, each of said orifice plates having variable size orifices so as to provide a sequence of controlled pressure drops and thereby to exert a back pressure within said furnace so as to maintain said furnace at a preselected internal pressure exceeding an average pressure of 13 p.s.i.g., means for introducing a liquid into said furnace gas before said furnace gas enters said orifice plates, and means connected to said washing means between two of said orifice plates, said connecting means communicating with said locking bell chamber so that said pressure in said locking bell chamber is maintained approximately equal to said preselected pressure in said furnace chamber adjacent said pressure locking bell chamber.

2. A blast furnace for reducing iron bearing ores; comprising an annular wall formed of refractory blocks, a gas tight metal jacket which is structurally continuous from top to bottom and completely encompassing said wall, an annular cooling jacket surrounding and spaced from said metal jacket to cool same, a pair of spaced conical shaped end bells of substantially equal size mounted in the upper end of said annular wall and defining a pressure locking bell chamber so as to form a substantially closed furnace chamber, means for introducing gas under pressure into said furnace chamber, means for discharging gases from said furnace evolved during the reduction of said ore, gas washing means connected to said discharge means, said gas washing means comprising a conduit and a plurality of lengthwise spaced orifice plates including means for adjustably varying the size of the orifices so that a control back pressure is exerted on said furnace and thereby to maintain said furnace at a preselected internal pressure exceeding an average pressure of 13 p.s.i.g., and means connected to said washing means between two of said orifice plates and communicating with said locking bell chamber so that said pressure in said locking bell chamber is approximately equal to said preselected pressure in said furnace chamber adjacent said pressure locking bell chamber.

References Cited in the file of this patent

UNITED STATES PATENTS 233,505    Hall                   Oct. 19, 1880

(Other references on following page)

UNITED STATES PATENTS

| | | |
|---|---|---|
| 1,039,282 | Hicks | Sept. 24, 1912 |
| 2,050,379 | Rice | Aug. 11, 1936 |
| 2,408,945 | Mohr et al. | Oct. 8, 1946 |
| 2,585,800 | Viseur et al. | Feb. 12, 1952 |
| 2,602,027 | Old | July 1, 1952 |
| 2,631,019 | Yates | Mar. 10, 1953 |
| 2,671,017 | McCutcheon | Mar. 21, 1954 |
| 2,673,083 | MacPherson et al. | Mar. 23, 1954 |
| 2,702,699 | Kinney | Feb. 22, 1955 |
| 2,768,705 | Isserlis | Oct. 30, 1956 |
| 2,797,904 | Voorheis | July 2, 1957 |

FOREIGN PATENTS

| | | |
|---|---|---|
| 652,960 | Great Britain | May 2, 1951 |